United States Patent [19]
Claffey et al.

[11] Patent Number: 6,011,913
[45] Date of Patent: Jan. 4, 2000

[54] METHOD AND APPARATUS FOR DETERMINATION OF SPACECRAFT DRAG

[75] Inventors: Douglas Claffey, Malvern; Paul Graziani, Wayne; James Tucholski; Don Dichmann, both of King of Prussia, all of Pa.

[73] Assignee: Analytical Graphics, Inc., Malvern, Pa.

[21] Appl. No.: 09/168,507

[22] Filed: Oct. 8, 1998

Related U.S. Application Data

[62] Division of application No. 08/877,751, Jun. 17, 1997, Pat. No. 5,864,489.

[51] Int. Cl.[7] .................................................. G06F 9/455
[52] U.S. Cl. ....................................................... 395/500.29
[58] Field of Search ........................... 395/500.29; 701/13

[56] References Cited

U.S. PATENT DOCUMENTS

| | | | |
|---|---|---|---|
| 4,688,092 | 8/1987 | Kamel et al. ............................ | 358/109 |
| 5,522,569 | 6/1996 | Steffy et al. ........................... | 244/158 R |
| 5,546,309 | 8/1996 | Johnson et al. .......................... | 364/434 |
| 5,687,084 | 11/1997 | Wertz ....................................... | 701/226 |
| 5,806,804 | 9/1998 | Goodzeit et al. ......................... | 244/169 |

*Primary Examiner*—Kevin J. Teska
*Assistant Examiner*—Ayni Mohamed
*Attorney, Agent, or Firm*—Roberts Abokhair & Mardula, LLC

[57] ABSTRACT

A method and apparatus for modeling the exposure of spacecraft-mounted solar power panels to the sun over a given time interval, such as an orbit period, and a method and apparatus for modeling the drag of spacecraft over a given time interval, such as an orbit period. The result of the exposure modeling can be used to determine varying availability of electrical power for operations to be performed by the spacecraft and on-board apparatus. The results of the drag over time are used to predict orbit decay and fuel requirements for orbit maintenance and station-keeping. The invention uses a graphically based satellite systems analysis program to approximate exposure and drag data through visual projection of the relevant spacecraft elements on a computer display screen.

22 Claims, 6 Drawing Sheets

METHOD AND APPARATUS FOR DETERMINATION OF SPACECRAFT DRAG

This application is a divisional of U.S. patent application Ser. No. 08/877,751 filed Jun. 17, 1997, now U.S. Pat. No. 5,864,489.

FIELD OF THE INVENTION

The present invention relates generally to spacecraft analysis, design and operation. In particular, the invention relates to solution of two problems in design and operation. The first problem is modeling the exposure of spacecraft-mounted solar power panels to the sun over a given time interval, such as an orbit period. The result of the exposure modeling can be used to determine varying availability of electrical power for operations to be performed by the spacecraft and on-board apparatus. The second problem is modeling the drag of a spacecraft over a given time interval, such as an orbit period. In this regard, the invention relates to modeling the drag forces acting on orbiting spacecraft, the results of which are used to predict orbit decay and fuel requirements for orbit maintenance and station-keeping.

BACKGROUND OF THE INVENTION

One of the most critical limiting factors affecting spacecraft operations is the availability of sufficient electrical power for those operations. Virtually all spacecraft operations demand electrical power. Examples include imaging, transmitting and receiving communications signals, sensor operation, data processing, spacecraft attitude adjustment and other activities related to the spacecraft's mission or the maintenance of its trajectory or orbit. The principal (if not sole) renewable source of energy for such operations is solar power, which is typically captured by one or more photovoltaic solar panels attached to the spacecraft exterior.

Solar panels are typically flat or planar with sensitivity on one face. However, they may otherwise take on a variety of shapes and sizes. Their disposition with respect to the spacecraft and each other will likewise, vary, depending on constraints imposed by spacecraft design and mission objectives. The amount of power captured by a flat solar panel varies directly with the extent to which it faces the sun (i.e., the extent to which the plane of the flat surface is perpendicular to the direction of the sun). When a flat solar panel is perpendicular to the direction of the sun with the sensitive face oriented to the sun, the maximum exposure is obtained, and when oriented 90 degrees or greater from perpendicular, the minimum exposure is obtained. Using the optimal or maximum solar exposure as a standard, a critical question in spacecraft operations is the percentage optimal exposure (hereinafter the "exposure ratio") occurring at various times during a given time interval. This information is required for missions such as an interplanetary voyage or an orbit around the earth or another body. The exposure ratio will determine, for example, whether a given set of operations can be performed during a given portion of the satellite orbit around the earth. If the power requirement is greater than the power available, it may be necessary for the satellite to shut itself down or delay operations during certain periods.

For the reasons stated, information on the exposure ratio is critical to mission planning. With respect to earth-orbiting satellites, exposure ratio is a major factor to be considered in determining the possible orbits (inclination, altitude, eccentricity, precession, etc.). This is critical as the orbit determines where the satellite will be at all times. The exposure ratio also plays a role in spacecraft design, including features of the spacecraft's shape and the size and position of objects (such as telescopes or sensors) mounted on its exterior, as well as the size, shape and placement of the solar panels themselves.

Traditionally, calculation of the exposure ratio is accomplished by applying complex and time-consuming mathematical operations to extensive data on the spacecraft itself, the orbit, the spacecraft attitude and other factors. Moreover, while this process may yield numerical data relating the exposure ratio to time, it does not provide an easy and reliable way to visually model the data, thereby facilitating alternative spacecraft designs or orbits to maximize the exposure ratio.

In a problem related to exposure, the drag acting on a satellite will determine how much fuel must be used to compensate for the drag, and the drag will also determine the orbit degradation over time. In a manner similar to that used to calculate exposure, traditional approaches have been heavily dependant on time-consuming calculations with very complex models. Further, existing orbital drag models are not highly accurate and mission planners rely heavily on historic orbit degradation to predict future degradation. This shortfall in drag models makes it difficult for satellite designers to optimize the satellite design and minimize drag effects.

To overcome the shortcomings of the traditional approach, a method and apparatus are needed that will quickly and reliably model the time-varying spacecraft exposure ratio and drag and, at the same time, allow for visual data display thereby facilitating alternative spacecraft design to optimize solar exposure and minimize drag.

SUMMARY OF THE INVENTION

It is therefore an object of the present invention to provide a method and apparatus to determine the solar exposure, over a given time interval, of one, or more spacecraft-mounted solar panels.

It is a further object of the present invention to provide a method and apparatus to determine the solar exposure, over a given time interval, of one or more spacecraft-mounted solar panels measured as a percentage of a defined optimum.

It is a further object of the present invention to provide a method and apparatus to determine the solar exposure, over a given time interval, of one or more spacecraft-mounted solar panels and to allow for visual modeling of the data to facilitate the design of alternatives that optimize such exposure.

It is a further object of the present invention to provide a method and apparatus to determine the solar exposure, over a given time interval, of one or more spacecraft-mounted solar panels, utilizing the graphical output of an existing satellite systems analysis visualization program to measure such exposure and to provide a visual display that enables space mission planners, and spacecraft designers to envision alternatives with improved solar exposure characteristics.

It is a further object of the present invention to provide a method and apparatus to determine the drag, over a given time interval, of a spacecraft in orbit.

It is a further object of the present invention to provide a method and apparatus to determine the drag, over a given time interval, of a spacecraft measured as a percentage of a defined optimum.

It is a further object of the present invention to provide a method and apparatus to determine the drag, over a given time interval, of a spacecraft and to allow for visual modeling of the data to facilitate the design of alternatives that optimize such drag.

It is a further object of the present invention to provide a method and apparatus to determine the drag, over a given time interval, of a spacecraft, utilizing the graphical output of an existing satellite systems analysis visualization program to measure such drag and to provide a visual display that enables space mission planners, and spacecraft designers to envision alternatives with improved drag characteristics.

These and other objects of the present invention will be apparent to those of ordinary skill in the art upon review of the claims drawn to the invention, the drawings, and the specification describing the invention.

DETAILED DESCRIPTION OF THE INVENTION

Building upon an existing satellite systems analysis visualization program, the present invention uses the graphical output of that program to determine the exposure ratio and drag over a given time interval. The present invention also provides for information display on the exposure ratio and drag in numerical and in graph form, to thereby enable mission planners and spacecraft designers to envision alternatives with improved solar exposure and drag characteristics. An example of an appropriate satellite systems analysis program is the computer based Satellite Tool Kit™, produced by Analytic Graphics, Inc.

Figure 1:
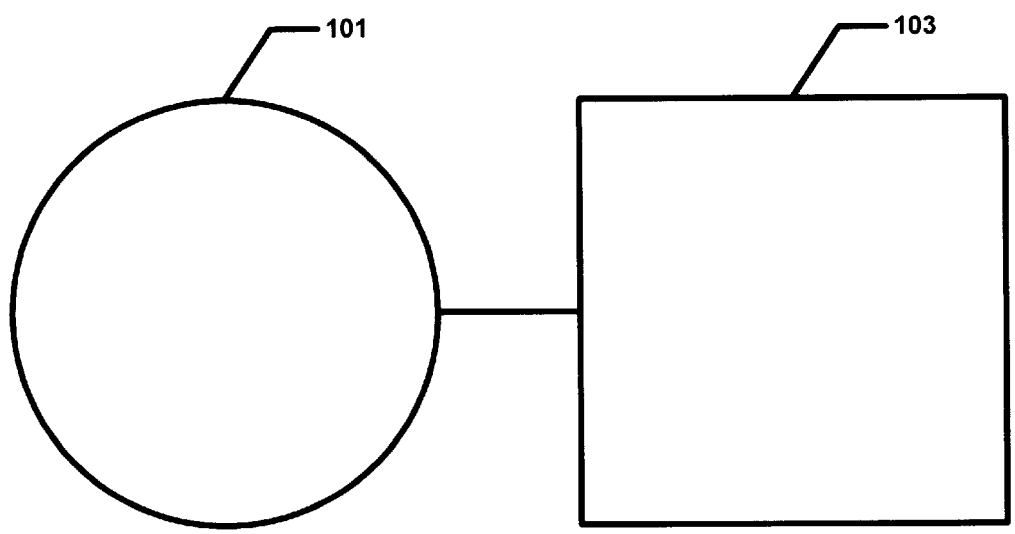
FIG. 1 illustrates a satellite solar panel with maximum exposure.

Referring to FIG. 1, the objects of the present invention are accomplished through use of the graphical output of a satellite systems analysis program featuring high resolution, three-dimensional, animated images of spacecraft, celestial bodies and other objects in the space environment. To set the baseline for measurement of the solar exposure ratio, the invention provides a calibration mechanism in which a visual representation of the spacecraft 101 and its solar panels 103 can be rotated into a position yielding a maximum solar exposure. A given color—preferably blue, green or red—is assigned to the operational side of the solar panels 103 in the visual representation, other articles with that color are re-colored as necessary so that they are not of the same color as that selected for the solar panel, and objects irrelevant to the analysis are eliminated from the visual display. As shown in FIG. 1, the visualization is set for a solar (i.e. from-the-sun) perspective, the visual representation of the spacecraft and its solar panels is rotated until the display contains the maximum quantity of pixels of the selected color from the solar panels 103, and that quantity becomes the baseline.

Figure 2:
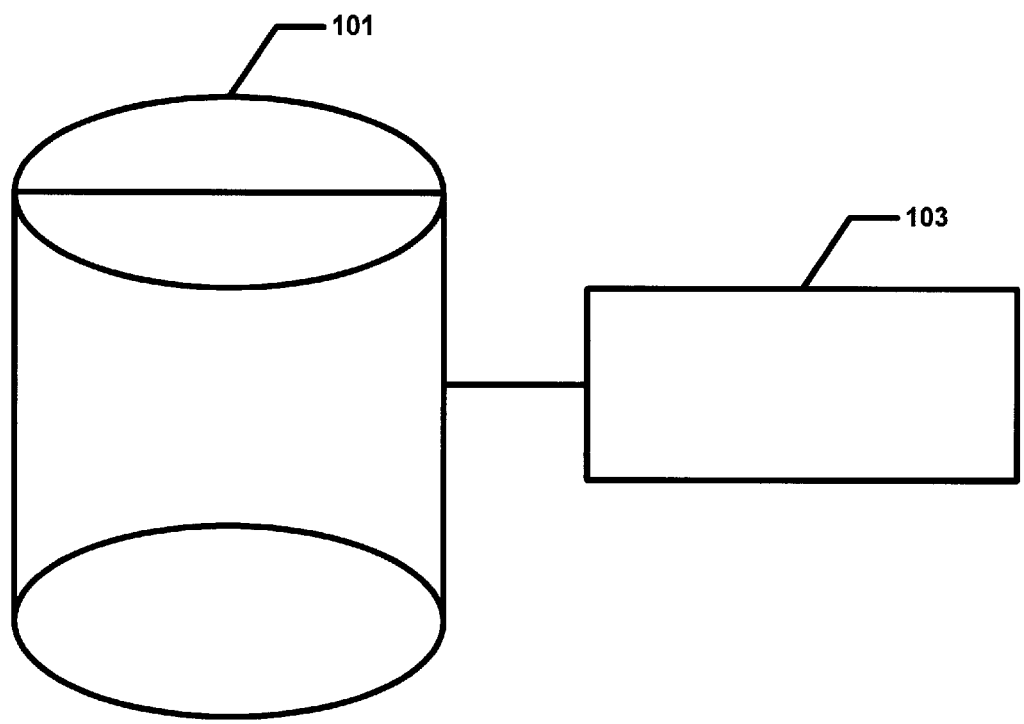
FIG. 2 illustrates a satellite solar panel with reduced exposure.
Figure 3:
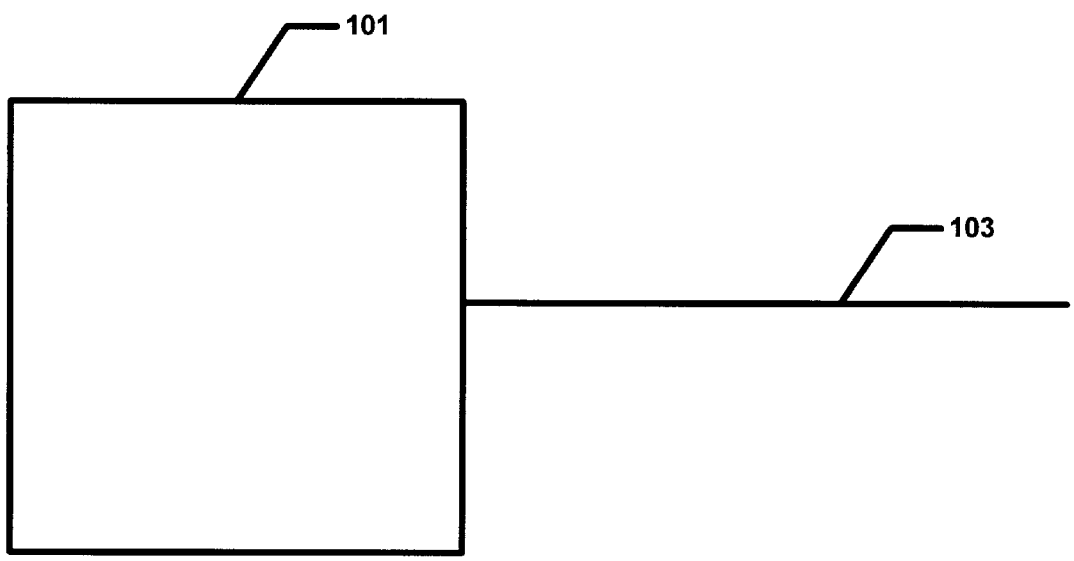
FIG. 3 illustrates a satellite solar panel with minimal exposure.

Referring to FIGS. 2 and 3, the satellite systems analysis scenario is then animated, and, at each animation step, a screen image is captured, the pixels of the selected color are re-counted and divided by the baseline number and the resulting percentage figure is recorded. As illustrated in FIG. 2, the orientation of the spacecraft 101 and solar panels 103 will change as the satellite moves through the orbit and the exposure of the solar panels will decrease from the maximum. Referring to FIG. 3, there may be times in the satellite orbit where the solar panels 103 are perpendicular to the maximum orientation, result in no exposure.

At the conclusion of the animation, the set of exposure ratios or percentage figures for discrete steps in the animation are displayed in a table or graph. Combined with information on the specifications of the solar panel and related power generation and storage apparatus, the exposure ratio data allows the mission planner to determine which time intervals are best suited to operations requiring electrical power.

By using a satellite systems analysis program that allows for easy manipulation of data on orbit characteristics, spacecraft attitude and other factors, the mission planner can readily make and try out adjustments to maximize solar exposure of the panels without sacrificing other mission objectives. Moreover, since the program includes a visual representation of the vehicle, the spacecraft designer will find it easier to envision design changes that will increase such exposure.

In a manner similar to that used to calculate exposure ratio, the present invention allows the mission planner and satellite designer to calculate maximum drag on the spacecraft and then using that drag as a baseline, calculate drag ratio over time.

Figure 4:
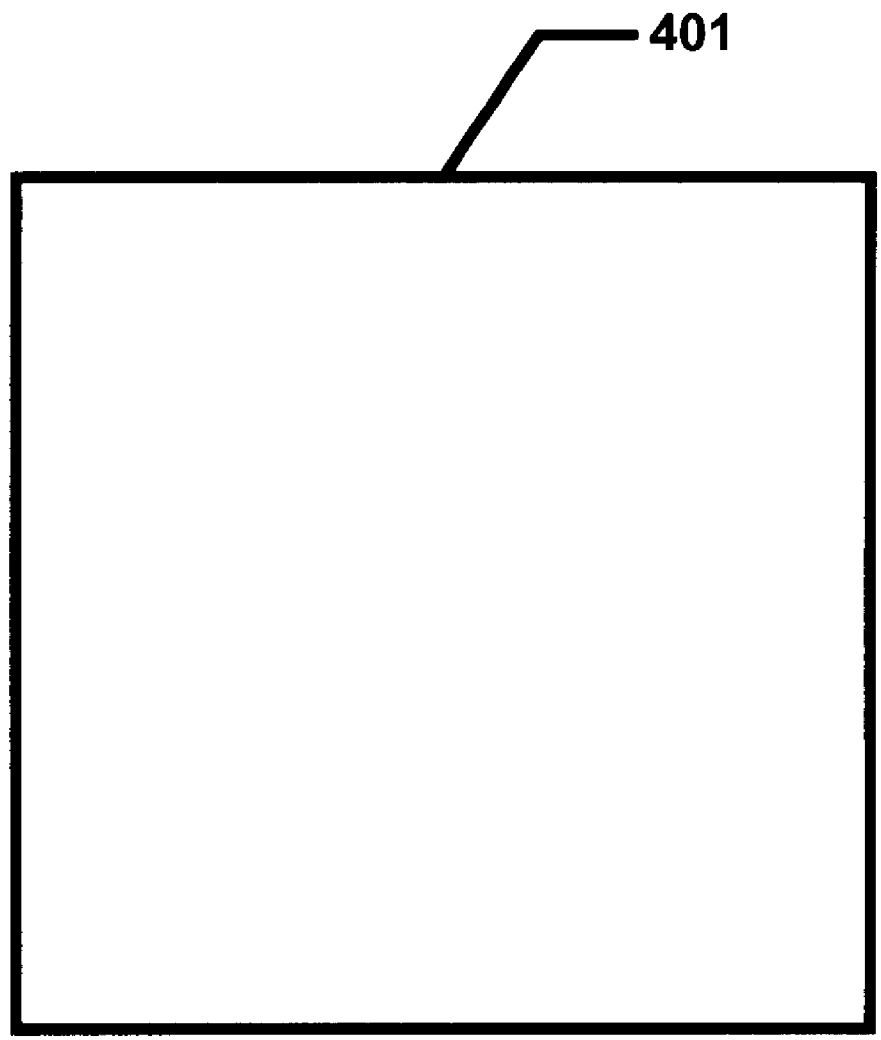
FIG. 4 illustrates a spacecraft with maximum drag.

Referring to FIG. 4, to set the baseline for measurement of the drag, the invention includes a calibration mechanism in which a visual representation of the entire spacecraft 401 can be rotated into a position yielding a maximum frontal area. To a first order, spacecraft drag is directly proportional to frontal area. A uniform color—preferably blue, green or red—is assigned to the spacecraft in the visual representation. As shown in FIG. 4, the visualization is set for an artificial co-orbiting body perspective that is directly ahead of the desired satellite orbit. The visual representation of the spacecraft is rotated until the display contains the maximum quantity of pixels of the selected color, and that quantity becomes the baseline.

Figure 5:
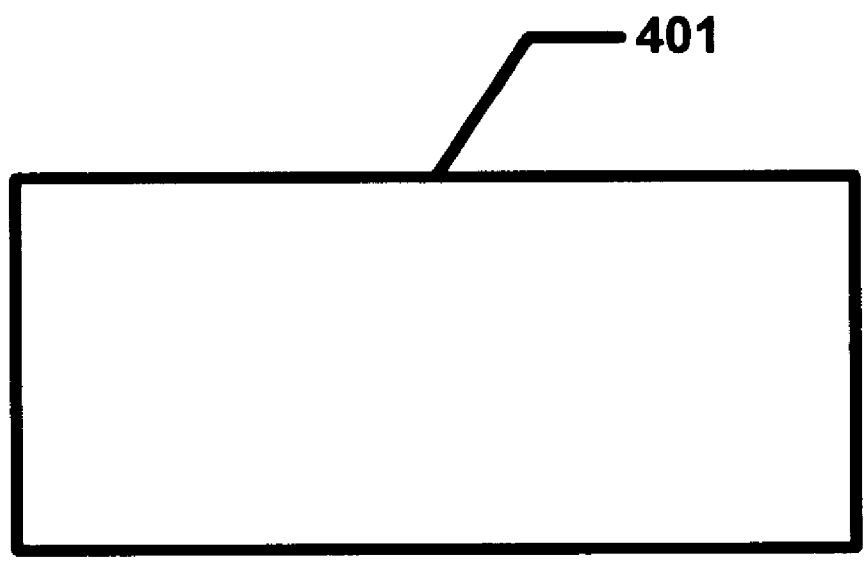
FIG. 5 illustrates a satellite with reduced drag.
Figure 6:
FIG. 6 illustrates a satellite with minimal drag.

Referring to FIGS. 5 and 6, the satellite systems analysis scenario is then animated, and, at each animation step, a screen image is captured, the pixels of the selected color are re-counted and divided by the baseline number and the resulting percentage figure is recorded. As illustrated in FIG. 5, the orientation of the spacecraft 401 will change as the satellite moves through the orbit and the frontal area will decrease from the maximum. Referring to FIG. 6, there may be times in the satellite orbit where large parts of the spacecraft are perpendicular to the maximum orientation, result in low drag.

At the conclusion of the animation, the set of drag ratios or percentage figures for discrete steps in the animation are displayed in a table or graph. Combined with information on the specifications of the spacecraft, and on-board fuel, the drag ratio data allows the mission planner to determine whether certain operations will adversely affect on-board fuel.

The objectives of the present invention are accomplished with the following capabilities in addition to those typically available in a satellite systems analysis program:

1. a calibration tool for determination of optimal solar exposure or drag in terms of the maximum number of pixels of a selected color appearing in the screen image as the visual representation of the spacecraft is rotated;

2. capture of a screen image and count of the pixels of the selected color at each animation step; and
3. an ability to removal irrelevant objects from the screen image.

What is claimed is:

1. A method for calculating drag comprising:
   (a) modeling physical, attitude and orbital parameters of a satellite in orbit;
   (b) modeling orbital parameters of an artificial body in an orbit synchronized to the satellite;
   (c) modeling individual elements of the satellite;
   (d) determining maximum exposure of the individual elements of the satellite to the artificial body;
   (e) determining time-varying exposure of the individual elements to the artificial body during the satellite orbit;
   (f) computing ratios between the time-varying exposure and the maximum exposure; and
   (g) displaying the ratios in graphic and textual form.

2. The method for calculating drag ratios of claim 1 wherein modeling physical, attitude and orbital parameters of a satellite in orbit, modeling orbital parameters of an artificial body, and modeling individual elements of the satellite further comprises:
   (a) modeling satellite orbital parameters of a satellite orbiting a celestial body;
   (b) modeling orbital parameters of an artificial body in an orbit synchronized to the satellite;
   (c) modeling satellite attitude parameters of the satellite in the orbit;
   (d) modeling the shape, size and interconnection of a plurality of individual elements of the satellite; and
   (e) selecting individual elements of the satellite for analysis.

3. The method for calculating drag ratios of claim 1 wherein determining maximum exposure, determining time-varying exposure and computing ratios further comprises:
   (a) determining the maximum exposure of the satellite elements to the artificial body using a combination of the artificial body orbital parameters, the satellite orbital parameters, the satellite attitude parameters, and the shape, size and interconnection of the individual elements;
   (b) establishing the maximum exposure as a baseline value;
   (c) determining the exposure of the satellite elements to the artificial body at a plurality of discrete time steps as modeled by the combination of the artificial body orbital parameters, the satellite orbital parameters, the satellite attitude parameters, and the shape, size and interconnection of the individual elements; and
   (d) computing a plurality of exposure ratios using the exposure at the plurality of discrete time steps and the baseline value.

4. The method for calculating drag ratios of claim 1 wherein modeling individual elements of the satellite further comprises:
   (a) identifying all surfaces on the satellite as individual elements;
   (b) assigning a color to the surfaces; and
   (c) removing irrelevant objects of the satellite from the model.

5. The method for calculating drag ratios of claim 4 wherein determining maximum exposure of the individual elements of the satellite to the artificial body further comprises:
   (a) adjusting the satellite attitude such that the sum of all surfaces have maximum exposure to the artificial body; and
   (b) calculating a projected area of the surfaces.

6. The method for calculating drag ratios of claim 5 wherein calculating a projected area further comprises:
   (a) creating a video display with a perspective from the artificial body toward the satellite;
   (b) counting the number of pixels of the first color on the video display.

7. The method for calculating drag ratios of claim 6 wherein counting further comprises:
   (a) using automated means to count the number of pixels of the first color present on the video display.

8. The method for calculating drag ratios of claim 1 wherein determining time-varying exposure of the individual elements of the satellite to the artificial body further comprises:
   (a) creating a time-varying series of observation events during which the physical, attitude and orbital parameters of the satellite are used to position the satellite surfaces relative to the artificial body; and
   (b) calculating a projected area of the surfaces at each observation event.

9. The method for calculating drag ratios of claim 8 wherein calculating a projected area further comprises:
   (a) creating a video display with a perspective from the artificial body toward the satellite;
   (b) counting the number of pixels of the color on the video display.

10. The method for calculating drag ratios of claim 9 wherein counting further comprises:
    (a) using automated means to count the number of pixels of the first color present on the video display.

11. The method for calculating drag ratios of claim 1 further comprising:
    (a) using a computer based satellite analysis program with animation tools to model the physical, attitude and orbital parameters of the satellite in orbit, the orbital parameters of the artificial body and the individual elements of the satellite;
    (b) using screen image capture of a video display from the satellite analysis program to record the number of pixels of a selected color appearing in the screen image as the representation of surfaces of the satellite at different animation steps;
    (c) using the satellite analysis program to remove irrelevant objects from the screen image; and
    (d) counting the number of pixels of the selected color at the different animation steps.

12. A system for calculating drag comprising:
    (a) means for modeling physical, attitude and orbital parameters of a satellite in orbit;
    (b) means for modeling orbital parameters of an artificial body in an orbit synchronized to the satellite;
    (c) means for modeling individual elements of the satellite;
    (d) means for determining maximum exposure of the individual elements of the satellite to the artificial body;
    (e) means for determining time-varying exposure of the individual elements to the artificial body during the satellite orbit;
    (f) means for computing ratios between the time-varying exposure and the maximum exposure; and (g) means for displaying the ratios in graphic and textual form.

13. The system for calculating drag ratios of claim 12 wherein means for modeling physical, attitude and orbital parameters of a satellite in orbit, means for modeling orbital parameters of an artificial body, and means for modeling individual elements of the satellite further comprises:

(a) means for modeling satellite orbital parameters of a satellite orbiting a celestial body;

(b) means for modeling orbital parameters of an artificial body in an orbit synchronized to the satellite;

(c) means for modeling satellite attitude parameters of the satellite in the orbit;

(d) means for modeling the shape, size and interconnection of a plurality of individual elements of the satellite; and (e) means for selecting individual elements of the satellite for analysis.

14. The system for calculating drag ratios of claim 12 wherein means for determining maximum exposure, determining time-varying exposure and computing ratios further comprises:

(a) means for determining the maximum exposure of the satellite elements to the artificial body using a combination of the artificial body orbital parameters, the satellite orbital parameters, the satellite attitude parameters, and the shape, size and interconnection of the individual elements;

(b) means for establishing the maximum exposure as a baseline value;

(c) means for determining the exposure of the satellite elements to the artificial body at a plurality of discrete time steps as modeled by the combination of the artificial body orbital parameters, the satellite orbital parameters, the satellite attitude parameters, and the shape, size and interconnection of the individual elements; and (d) means for computing a plurality of exposure ratios using the exposure at the plurality of discrete time steps and the baseline value.

15. The system for calculating drag ratios of claim 12 wherein means for modeling individual elements of the satellite further comprises:

(a) means for identifying all surfaces on the satellite as individual elements;

(b) means for assigning a color to the surfaces; and (c) means for removing irrelevant objects of the satellite from the model.

16. The system for calculating drag ratios of claim 15 wherein means for determining maximum exposure of the individual elements of the satellite to the artificial body further comprises:

(a) means for adjusting the satellite attitude such that the sum of all surfaces have maximum exposure to the artificial body; and (b) means for calculating a projected area of the surfaces.

17. The system for calculating drag ratios of claim 16 wherein means for calculating a projected area further comprises:

(a) means for creating a video display with a perspective from the artificial body toward the satellite;

(b) means for counting the number of pixels of the first color on the video display.

18. The system for calculating drag ratios of claim 17 wherein means for counting further comprises:

(a) automated means to count the number of pixels of the first color present on the video display.

19. The system for calculating drag ratios of claim 12 wherein means for determining time-varying exposure of the individual elements of the satellite to the artificial body further comprises:

(a) means for creating a time-varying series of observation events during which the physical, attitude and orbital parameters of the satellite are used to position the satellite surfaces relative to the artificial body; and (b) means for calculating a projected area of the surfaces at each observation event.

20. The system for calculating drag ratios of claim 19 wherein means for calculating a projected area further comprises:

(a) means for creating a video display with a perspective from the artificial body toward the satellite; and (b) means for counting the number of pixels of the color on the video display.

21. The system for calculating drag ratios of claim 20 wherein means for counting further comprises:

(a) automated means to count the number of pixels of the first color present on the video display.

22. The system for calculating drag ratios of claim 12 further comprising:

(a) a computer based satellite analysis program with animation tools to model the physical, attitude and orbital parameters of the satellite in orbit, the orbital parameters of the artificial body and the individual elements of the satellite;

(b) a video display with means for screen image capture to record the number of pixels of a selected color appearing in the screen image as the representation of surfaces of the satellite at different animation steps;

(c) means for removing irrelevant objects from the screen image; and (d) means for counting the number of pixels of the selected color at the different animation steps.

* * * * *